United States Patent
Rumpf

(10) Patent No.: US 6,235,405 B1
(45) Date of Patent: May 22, 2001

(54) ELECTRODEPOSITED ALLOY LAYER, IN PARTICULAR AN OVERLAY OF A PLAIN BEARING

(75) Inventor: Thomas Rumpf, Gmunden (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 09/534,106

(22) Filed: Mar. 23, 2000

(30) Foreign Application Priority Data

Mar. 26, 1999 (AT) ........................................................ 563/99

(51) Int. Cl.[7] .............................. F16C 33/12; B32B 5/00; B32B 15/00; C25D 7/10
(52) U.S. Cl. .......................... 428/615; 428/645; 428/935; 428/923; 384/912; 205/109
(58) Field of Search ..................................... 428/615, 646, 428/647, 648, 935, 923; 205/109; 384/912

(56) References Cited

U.S. PATENT DOCUMENTS

| 3,658,488 | * | 4/1972 | Brown et al. | ................................ | 29/195 |
| 4,886,583 | * | 12/1989 | Martinou et al. | ..................... | 205/109 |
| 5,185,216 | * | 2/1993 | Tanaka et al. | ........................ | 428/614 |
| 5,266,181 | * | 11/1993 | Matsumura et al. | ................. | 205/109 |
| 6,022,629 | * | 2/2000 | Rumpf et al. | ......................... | 428/553 |

FOREIGN PATENT DOCUMENTS 196 22 166   12/1997   (DE) .
2 271 780    4/1994    (GB) .

\* cited by examiner

*Primary Examiner*—John J. Zimmerman
(74) *Attorney, Agent, or Firm*—Collard & Roe, P.C.

(57) ABSTRACT

There is described an electrodeposited alloy layer, in particular an overlay (2) of a plain bearing, comprising a layered alloy having at least one alloying element in addition to a base metal (3), in whose matrix containing the alloying element in a finely crystalline form inorganic particles with a diameter smaller than 2 $\mu$m are incorporated finely divided. To ensure the finely crystalline structure of the alloying element deposited in the alloy matrix, it is proposed that the inorganic particles used as nucleating agents with a diameter of 0.01 to 1 $\mu$m should have a crystal form at least substantially corresponding to the form of crystallization of the alloying element.

5 Claims, 1 Drawing Sheet

ELECTRODEPOSITED ALLOY LAYER, IN PARTICULAR AN OVERLAY OF A PLAIN BEARING

FIELD OF THE INVENTION

This invention relates to an electrodeposited alloy layer, in particular an overlay of a plain bearing, comprising a layered alloy having at least one alloying element in addition to a base metal, in whose matrix containing the alloying element in a finely crystalline form inorganic particles with a diameter smaller than 2 μm are incorporated finely divided.

DESCRIPTION OF THE PRIOR ART

To increase the hardness and the wear resistance of multilayer plain bearings with an electrodeposited lead-based overlay with the addition of tin, inorganic hard particles are embedded in the overlay matrix, which hard particles should rather be finely divided in individual particles in the overlay. For this purpose it is known (DE 196 22 166 A1) to use an electroplating bath free from fluoroborate with the addition of a non-ionic wetting agent for isolating the hard particles already in the electroplating bath, so that these hard particles with a diameter smaller than 2 μm are deposited finely divided together with the alloying constituents. By using an organic grain diminution agent in the electroplating bath there should also be achieved a finely crystalline deposition of the tin in the alloy matrix. Under thermal loads as they occur in plain bearings for internal combustion engines, a coarsening of the tin deposits occurs despite these measures, namely as a result of the temperature-dependent solubility of tin in the lead matrix. When the tin dissolved in the lead upon heating cools down, a coarser-grained tin phase occurs due to its tendency to reduce its surface as compared to the lead, where smaller deposits preferably attach to already existing larger deposits. The hard particles incorporated in the alloy matrix, which include carbides, oxides, nitrides, borides or silicides, have an influence on the diffusion of tin particles, but not on their tendency to coarsen, so that a corresponding ageing of the overlay due to a coarsening of its structure must be expected.

Since the electrodeposition of an alloy from an electroplating bath usually occurs in a temperature range below the melting and softening points of the alloying constituents, electrodeposited alloy layers generally represent metastable, supersaturated, solid solutions. When the heat cycles occurring during the operation of the engine fall below the solubility limit, alloying elements are deposited from the alloy matrix in elementary form or as intermetallic compounds, where this deposition largely takes place uncontrolled, but with a tendency to form larger deposits at the expense of the smaller deposits, so that this ageing behavior is not restricted to overlays of plain bearings, although the same are particularly important for such bearings.

SUMMARY OF THE INVENTION

It is therefore the object underlying the invention to provide an electrodeposited alloy layer, in particular an overlay of a plain bearing, wherein ageing due to a heat-related coarsening of the structure can be largely be prevented.

Proceeding from an electrodeposited alloy layer as described above, this object is solved by the invention in that the inorganic particles used as nucleating agents with a diameter of 0.01 to 1 μm have a crystal form at least substantially corresponding to the form of crystallization of the alloying element.

On the condition that their crystal form at least substantially corresponds to the form of crystallization of the alloying element whose finely crystalline deposition in the alloy matrix should be ensured, the inorganic particles, which have so far only been used for dispersion hardening, may surprisingly be used as nuclei for this alloying element, which due to the small diameters of these nuclei and the large enough number of nucleating agents crystallizes at many points at the same time, which first of all leads to a particularly fine distribution of this alloying element in the alloy matrix. Since the nucleating agents, which at the occurring treatment temperatures are insoluble in the alloy matrix, are fixed in the matrix and in the case of a temperature-related local dissolution of the alloying element are liberated in the base metal, the liberated inorganic particles are again available as nucleating agents when the solubility limit of the alloying element is not reached, so that the deposited alloying element preferably again crystallizes at these nuclei.

To be able to form a nucleus, the diameter of the nucleating agents must have a certain minimum magnitude, which is about 0.01 μm. To be able to ensure the finely crystalline structure of the alloying element deposited in the alloy matrix, the nucleating agents themselves should not be chosen too coarse-grained. An upper diameter of 1 pm is still acceptable in this connection, altough with an upper particle size of 0.5 μm better crystallization conditions can be created. A particle diameter between 0.03 and 0.5 μm turned out to be useful for most applications. Probably due to their small size, the inorganic particles used as nucleating agents do not effect a relevant dispersion hardening of the alloy layer.

As explained already, it is of major importance for a finely crystalline deposition of the alloying element in the alloy matrix to provide a sufficient number of nuclei. The concentration of the nuclei should be adapted to the concentration of the alloying element such that in essence for each deposited particle of the alloy phase an inorganic particle is available as nucleus. To satisfy this request, the total surface of the inorganic particles in a volume unit of the overlay may be ten to ten thousand times, preferably hundred to thousand times as large as the surface unit associated to the volume unit. In this connection it should be noted that to perform their function, the inorganic particles should preferably have a spherical structure, but not an acicular structure.

BRIEF DESCRIPTION OF THE DRAWING

In the drawing, the subject-matter of the invention is represented by way of example, wherein.

DESCRIPTION OF THE PREFERRED EMBODIMENT

Figure 1:
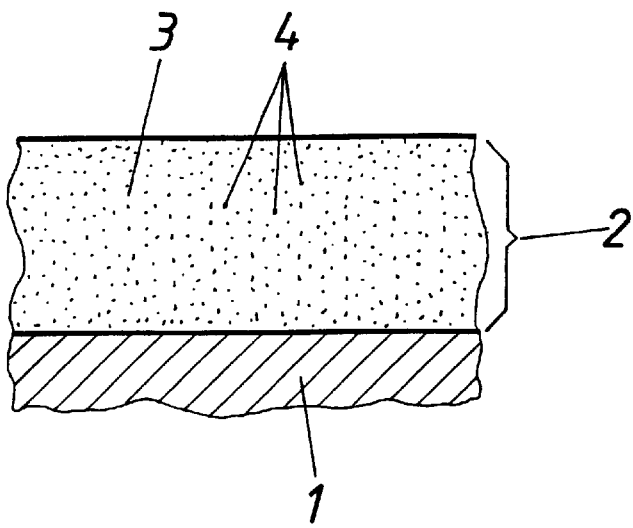
FIG. 1 shows an inventive overlay of a plain bearing in an enlarged, schematic cross-section.

The overlay 2 electrodeposited from an electroplating bath on a substrate 1, possibly by interposing a coupling layer, consists of an alloy including a base metal 3, whose matrix has finely divided, crystalline deposits 4 of at least one alloying element. Independent of whether nuclei in the form of inorganic particles with a crystal form adapted to the form of crystallization of the alloying element are inserted or not in the overlay 2 in accordance with the invention, can a uniform, finely crystalline deposition of the alloying element in the matrix of the base metal 3 in accordance with FIG. 1 be achieved by means of suitable refining agents. The essential difference between an inventive overlay and a conventional overlay will only be revealed after a corresponding heat treatment of the electrodeposited overlays 2.

Figure 2:
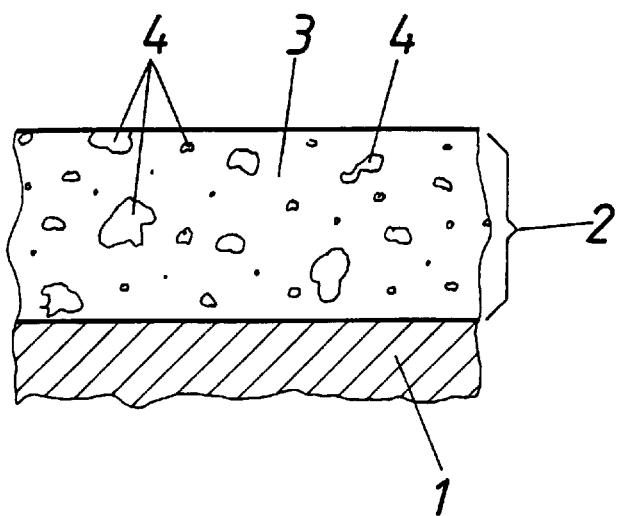
FIG. 2 shows a representation corresponding to FIG. 1 of a comparable overlay in accordance with the prior art after a heat treatment.
Figure 3:
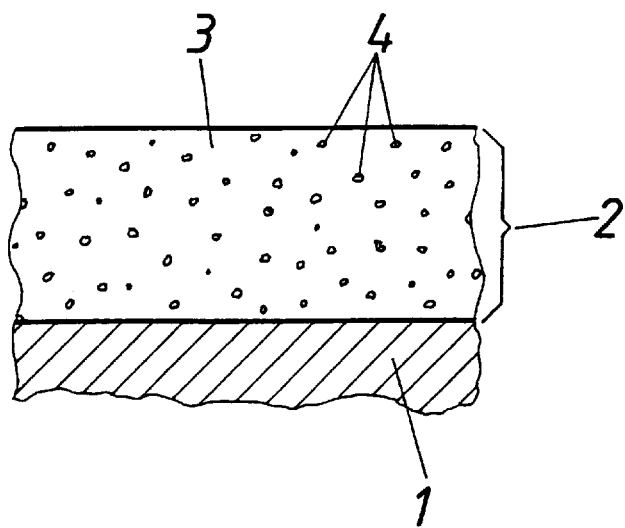
FIG. 3 shows the overlay in accordance with FIG. 1 after a heat treatment corresponding to the heat treatment of the overlay in accordance with FIG. 2.

Analogous to a thermal load of the plain bearings in a diesel engine, the bearings to be compared were each exposed to a thermal load of 150° C. for a period of 20 hours in 50 heat treatment cycles, which thermal load was each interrupted for four hours between the individual cycles. As is shown in FIG. 2, in conventional overlays for instance on the basis of lead with a corresponding addition of tin comparatively coarse tin deposits are formed as a result of this heat treatment, which deposits can easily reach a grain size up to 10 μm, which inevitably leads to defects in the matrix structure. However, when nucleating agents in the form of inorganic particles are incorporated in the alloy matrix, the coarsening of the tin deposits observed in the prior art can largely be prevented when the inorganic particles have a tetragonal crystal form corresponding to the tin, as this applies for instance to particles of rutile ($TiO_2$). In the case of a corresponding restriction of the grain sizes of these particles to a value smaller than 1 μm, the tin precipitated from the lead matrix between the thermal loads due to the temperature will find a plurality of nucleating agents uniformly distributed in the alloy matrix, so that corresponding nuclei are obtained, which ensure a uniform deposition of tin without having to fear a significant coarsening of the tin deposits. There can merely be detected a minor coarsening of the tin deposits, which remains, however, restricted, as is indicated in FIG. 3.

Although the invention is particularly significant in plain bearings having preferably lead-based overlays, it is not restricted to this field of application. Apart from lead as base metal of the layered alloy, there may for instance also be used gold, silver, copper and tin, with tin, copper, lead, bismuth, antimony, nickel, zinc, indium and cobalt being chiefly considered as alloying elements, depending on the kind of base metal. From these alloying elements, lead, copper and nickel belong to the cubic, bismuth and antimony to the rhombohedral, tin and indium to the tetragonal, as well as zinc and cobalt to the hexagonal crystal system. Accordingly, inorganic particles must be used as nucleating agents, which crystallize in a cubic, rhombohedral, tetragonal or hexagonal form. Since boron nitride crystallizes in a cubic form, boron nitride can be used for all alloying elements of the cubic crystal system. For alloying elements of the rhombohedral crystal system the rhombohedral modification of silicon carbide, graphite and chromium boride may be used due to their rhombohedral form of crystallization. Rutile (titanium dioxide), chromium boride and zirconium silicate crystallize in a tetragonal form, whereas alumina, the hexagonal modification of boron nitride, the hexagonal modification of silicon carbide, molybdenum sulfide and a corresponding modification of graphite crystallize in a hexagonal form, so that from these inorganic particles nucleating agents for alloying elements of the tetragonal and hexagonal crystal systems can be obtained.

To examine the inventive effect, an overlay of a plain bearing on the basis of lead with 10 wt-% tin was conventionally deposited from an electroplating bath which contained 100 g/l lead as fluoroborate, 15 g/l tin as fluoroborate, 50 g/l free fluoroboric acid, 2 g/l fine grain additive, and 4 g/l of a smoothing agent. The overlay in accordance with the invention was prepared from an analogously structured electrolyte, but with the difference that the electrolyte contained an addition of titanium dioxide in the tetragonal modification rutile with an average grain size of 0.4 μm (maximum grain size 0.6 μm, minimum grain size 0.2 μm) and in a concentration of 10 g/l. By means of a dispersing agent and a corresponding stirring means the rutile powder was maintained in suspension in the electrolyte. In the deposited condition, a fine-grained matrix structure existed both in the conventional overlay and in the inventive overlay, where the tin phase could hardly be recognized under an optical microscope. After the long-term heat treatment described above, comparatively coarse tin deposits with a diameter up to 10 μm were present in the conventional overlay. However, the long-term heat treatment of the overlay in accordance with the invention only led to a minor coarsening of the tin deposits, which could just be recognized under an optical microscope. For the diameter of the tin deposits appearing under an optical microscope an upper limit of 1 μm could be defined. In addition, bearings with an inventive overlay exhibited a substantially improved running behavior as well as a distinctly reduced tendency of overlay particles to shelling, which involves a correspondingly higher wear resistance.

Similarly, lead-based overlays with 7 wt-% indium, with 7 wt-% tin and 7 wt-% indium, with 15 wt-% antimony as well as with 12 wt-% antimony and 9 wt-% tin as alloying constituents were produced with and without inventive addition of nucleating agents, and there were always obtained the described conditions as regards the deposition of the alloying elements. This is not only true for lead-based overlays, but also for tin-based overlays with the alloying elements antimony, cobalt, nickel or zinc, for silver-based overlays with the alloying additives bismuth or antimony as well as for copper-based overlays with the alloying elements bismuth, lead, tin or zinc.

When alloys with several alloying elements are used, such as PbSnCu, PbSnin, SnZnCu, SnSbCu, AgSnCu, AgSbCu, CuPbBi and the like, the respectively required nucleating agents must be selected as regards their crystal form and be composed corresponding to the respective alloying elements, corresponding to the respective crystal system of the individual alloying elements.

What is claimed is:

1. Electrodeposited alloy layer comprising a layered alloy having at least one alloying element in addition to a base metal, in whose matrix containing the alloying element in a finely crystalline form inorganic particles with a diameter smaller than 2 μm are incorporated finely divided, characterized in that the inorganic particles used as nucleating agents with a diameter of 0.01 to 1 μm have a crystal form at least substantially corresponding to the form of crystallization of the alloying element.

2. The electrodeposited alloy layer as claimed in claim 1, characterized in that the inorganic particles have a diameter of 0.03 to 0.5 μm.

3. The electrodeposited alloy layer as claimed in claim 1, characterized in that the total surface of the inorganic particles in a volume unit of the overlay is ten to ten thousand times as large as the surface unit associated with the volume unit.

4. The electrodeposited alloy layer as claimed in claim 3, characterized in that the total surface of the inorganic particles in a volume unit of the overlay is hundred to thousand times as large as the surface unit associated with the volume unit.

5. Electrodeposited alloy overlay of a plain bearing comprising a layered alloy having at least one alloying element in addition to a base metal, in whose matrix containing the alloying element in a finely crystalline form inorganic particles with a diameter smaller than 2 μm are incorporated finely divided, characterized in that the inorganic particles used as nucleating agents with a diameter of 0.01 to 1 μm have a crystal form at least substantially corresponding to the form of crystallization of the alloying element.

* * * * *